United States Patent [19]  [11] 4,149,969
Robitaille et al.  [45] Apr. 17, 1979

[54] PROCESS AND COMPOSITION FOR INHIBITING CORROSION OF METAL PARTS IN WATER SYSTEMS

[75] Inventors: Dennis R. Robitaille, Canton; Mark S. Vukasovich, Ann Arbor, both of Mich.

[73] Assignee: AMAX Inc., Greenwich, Conn.

[21] Appl. No.: 780,530

[22] Filed: Mar. 23, 1977

[51] Int. Cl.$^2$ ............................ C02B 5/02; C02B 5/06
[52] U.S. Cl. ............................................ 252/181; 210/58; 252/180; 252/389 A; 252/390; 252/391; 422/16
[58] Field of Search .................... 21/2.7 R, 2.7 A; 210/57-59; 252/8.55 E, 180, 181, 389 A, 390, 391

[56] References Cited

U.S. PATENT DOCUMENTS

| | | | |
|---|---|---|---|
| 3,714,066 | 1/1973 | King et al. | 21/2.7 R |
| 3,794,603 | 2/1974 | O'Neal Jr. et al. | 21/2.7 R |
| 3,891,568 | 6/1975 | Nishio et al. | 21/2.7 A |
| 3,989,637 | 11/1976 | Hogue et al. | 210/58 |

*Primary Examiner*—Charles N. Hart
*Assistant Examiner*—Peter A. Hruskoci
*Attorney, Agent, or Firm*—Harness, Dickey & Pierce

[57] ABSTRACT

A process and a composition for inhibiting corrosion of metal parts in water systems such as in recirculating cooling towers and the like, while additionally suppressing scale formation and inhibiting corrosion of copper and copper-containing alloys which comprises adding and dissolving in the aqueous system, a controlled combination of active constituents in effective amounts comprising as essential constituents, an alkali molybdate salt, a divalent metal cation selected from the group consisting of $ZN^{++}$, $Mn^{++}$ and $Ni^{++}$; 1-hydroxyethylidene-1,1-diphosphonic acid and the aqueous soluble alkali salts thereof; and an organic agent selected from the group consisting of 2-mercaptobenzothiazole and the alkali salts thereof; 1,2,3-benzotriazole, and tolyltriazole.

9 Claims, No Drawings

PROCESS AND COMPOSITION FOR INHIBITING CORROSION OF METAL PARTS IN WATER SYSTEMS

BACKGROUND OF THE INVENTION

Various organic and inorganic compounds and materials have heretofore been used or proposed for use for reducing corrosive attack of metal surfaces of various water systems, such as recirculating cooling towers and the like. The aeration of the water in such recirculating water systems, containing high concentrations of dissolved oxygen, has been found particularly corrosive to ferrous and cupreous metal substrates. Of the various additive agents heretofore proposed, aqueous soluble chromate salts alone or in combination with other additive agents have been in widespread use in cooling water treatment systems. However, recent legislation, including the Federal Waters Protection Control Act, its amendments, and other related state and local statutes, have imposed restrictions on the use of toxic substances, including chromates, from being discharged into sewage systems due to the environmental hazards associated with aquatic life coming in contact therewith.

The process and composition of the present invention provides for an improved formulation suitable for use in various water systems comprising a carefully controlled combination of specific compounds in controlled effective concentrations, providing excellent corrosion inhibition of ferrous surfaces, as well as a suppression of scale formation and a corrosion inhibition of copper and copper-base alloys, which is effective in relatively small quantities, which is of economical use and which can, in many instances, be discharged to waste in compliance with environmental regulations without further treatment.

SUMMARY OF THE INVENTION

The benefits and advantages of the present invention are based on the discovery of a synergistic interreaction resulting from the use of four carefully controlled additive constituents present in effective amounts, providing thereby an inhibited water system which effectively reduces the corrosion of metal surfaces, including iron, steel, copper and copper alloy surfaces, and also suppresses the formation of scale on such surfaces in various type water systems when employed in relatively minimal amounts. In accordance with its process aspects, the present invention involves the steps of adding and dissolving into the water or aqueous system, an alkali molybdate compound, a divalent cation selected from the group consisting of $Zn^{++}$, $Mn^{++}$ and $Ni^{++}$; an organic compound consisting of 1-hydroxyethylidene-1,1-diphosphonic acid (HEDP) which performs both a scale suppression and corrosion inhibition function; a second organic compound selected from the group consisting of 2-mercaptobenzothiazole (MBT) and the alkali salts thereof; 1,2,3-benzotriazole (BT) and tolyltriazole (TT), which functions primarily as a corrosion inhibitor for cupreous surfaces. Each of the foregoing constituents are present in amounts effective to inhibit the corrosion of ferrous surfaces exposed to the water and to further suppress scale formation and inhibit corrosion of cupreous metal parts. The synergistic interreaction of the four specific ingredients enables the formulation of inhibited water systems in accordance with the composition aspects of the present invention by employing concentrations of as low as 1 ppm of molybdate ions, cation concentrations as low as about 0.5 ppm up to about 5 ppm, concentrations as low as about 5 ppm up to about 25 ppm of HEDP and concentrations as low as about 0.5 ppm of the MBT, BT, or TT organic agents.

Additional benefits and advantages of the present invention will become apparent upon a reading of the description of the preferred embodiments taken in conjunction with the specific examples provided.

DESCRIPTION OF THE PREFERRED EMBODIMENTS

In accordance with its composition aspects, the present invention provides for an inhibited water system containing four essential constituents or agents, each of which must be present in the effective amount as hereinafter specified to provide a synergistic interaction, whereby unexpectedly effective corrosion inhibition of ferrous metal parts is achieved in further combination with an effective suppression of scale formation and an inhibition of corrosion of copper and copper alloy parts exposed to contact with the water system. The four constituents employed in the amounts as hereinafter specified provide a system which, in many cases, enables periodic blow-downs or discharge of portions of the water system directly to waste drains in compliance with environmental regulations without requiring further treatment.

The first constituent of the inhibited formulation comprises an alkali molybdate compound which comprises sodium molybdate, potassium molybdate, lithium molybdate, as well as ammonium molybdate compounds including ammonium dimolybdate and ammonium heptamolybdate. It should be understood that the terms "alkali" and "alkali salts", as herein employed and as set forth in the subjoined claims, are used in their broad sense and are intended to include compounds containing the alkali metals as well as compounds containing ammonium. Of the foregoing alkali molybdate compounds, sodium molybdate constitutes the preferred material because of its availability, compatibility with the system, as well as for economic reasons. The molybdate compound is employed in amounts so as to provide a molybdate ion concentration in the water of at least about 1 part per million (ppm) to as high as 100 ppm or higher, while concentrations of the molybdate ion ranging from about 2 ppm to about 10 ppm are usually preferred. The specific concentration of the molybdate ion employed will vary depending upon the degree of hardness of the water, its temperature, the magnitude of dissolved oxygen in the water and the quantity and susceptibility of the metal parts in the system to corrosive attack. While concentrations of the molybdate ion above about 100 ppm can be beneficially employed in most instances, concentrations above about 100 ppm normally do not provide for significant improvements in the inhibitive characteristics of the water systems and are undesirable for economic considerations. Satisfactory results are usually obtained employing molybdate ion concentrations within a range of about 2 up to about 10 ppm.

The second constituent of the inhibited water system comprises a divalent cation selected from the group consisting of $Zn^{++}$, $Mn^{++}$ and $Ni^{++}$. These cations can conveniently be introduced and dissolved in the water system by employing various aqueous soluble salts such as, for example, sulfates, nitrates, halide salts including chlorine, bromine, iodine; formates, selenates, aqueous soluble acetate salts, and the like. Of the foregoing, zinc sulfate, manganese sulfate and nickel nitrate constitute the preferred cationic salts for reasons of compatibility, availability and economics. Of the foregoing three cation species enumerated, the zinc cation constitutes the preferred material because of its apparent increased synergistic interaction with the remaining three constituents in providing for increased corrosion inhibition of ferrous metal surfaces.

The effective concentration of the cations may range from as little as about 0.5 ppm to concentrations above about 5 ppm. While some additional benefits are derived at concentrations above about 5 ppm, ordinarily the use of such higher concentrations provides for progressively decreasing improvements, such that such higher concentrations are generally undesirable for economic considerations. Satisfactory results are usually obtained when such cations are controlled in concentration from about 0.5 ppm to about 5 ppm.

The third constituent of the inhibited water system comprises an organic compound consisting of 1-hydroxyethylidene-1,1-diphosphonic acid (HEDP) as well as the aqueous soluble alkali salts thereof. This constituent, while normally employed as a scale inhibitor or scale suppressant in water systems, has been discovered, in accordance with the present invention, due to the synergistic interaction, to also contribute to the corrosion inhibition of ferrous metal surfaces. The HEDP compound is effective when employed in concentrations as low as about 5 ppm to concentrations of 25 ppm and higher. Here again, the use of concentrations of the HEDP compound in excess of about 25 ppm does provide somewhat further improvement in the inhibited characteristics of the water system, but the marginal increases obtained in consideration of the high cost of such compounds ordinarily is not justified. In accordance with the preferred practice of the present invention, the HEDP compound is controlled within a concentration of about 5 ppm to about 25 ppm.

The fourth constituent of the inhibited water system comprises an organic compound which is selected from the group consisting of 2-mercaptobenzothiazole (MBT), as well as the alkali salts thereof; 1,2,3-benzotriazole (BT), and tolyltriazole (TT). The addition of either one of these specific organic compounds not only contributes to the inhibition of corrosion of cupreous substrates, i.e., copper and copper alloys disposed in contact with the water, but also synergistically interacts with the other three constituents to provide for the unexpectedly improved inhibition of corrosion of ferrous metal surfaces. The MBT, BT and TT compounds are employed in effective amounts as low as about 1 ppm up to about 5 ppm or higher. As in the case of the HEDP compound, increases in the concentration thereof above about 5 ppm do provide some marginal benefits, but the high cost of such compounds in consideration of the benefits achieved normally are not justified. For this reason, the concentration of the MBT compound, BT compound or TT compound, is preferably controlled within a range of about 1 ppm to about 5 ppm.

Each of the four constituents are added and dissolved individually or in the form of a concentrate in the aqueous system, such as a cooling water in a circulating water cooling tower, to provide effective concentrations thereof within the ranges as hereinabove specified. The effectiveness of the composition and the method of inhibiting water treatment systems as hereinabove described is further demonstrated by way of clarification in the following examples. It will be understood the examples are provided for illustrative purposes and are not intended to be limiting of the scope of the present invention as described and as set forth in the subjoined claims.

EXAMPLE

A test water is prepared by adding to distilled water, 25 milligrams per liter (mg/l) calcium calculated as calcium carbonate, 15 mg/l magnesium calculated as calcium carbonate, 250 mg/l chloride ions, 520 mg/l sulfate ion, 170 mg/l sodium bicarbonate and 25 mg/l sodium carbonate. The foregoing water composition is typical of a water categorized as highly corrosive and of a "soft" degree of hardness.

A series of water inhibited compositions was prepared employing the basic test water composition, to which various constituents were added in different combinations and concentrations in accordance with the teachings of the present invention to evaluate the synergistic interaction of the constituents and the inhibition of corrosion of ferrous metal parts in contact therewith.

The determination of the corrosion rates of the test panels was made in accordance with the so-called "spinner test" which has been widely adopted for the preliminary evaluation of water treatment formulations. The test apparatus comprises a tank composed of polycarbonate resin having a capacity of 16 liters which is equipped with a quartz immersion-type heating element for heating the test water solution and maintaining it at a substantially constant temperature of 120° F (49° C). The tank is further equipped with a gas dispersion tube immersed therein for maintaining the water system saturated with air. A rotor is rotatably supported beneath the level of water and incorporates four support pins at 90° intervals around the periphery thereof, to which low carbon steel test panels or coupons (Type QD, Q Panel Co., Cleveland, Ohio) are fastened. The panels are of a size of about one inch by three inches long (25 × 76 mm). The rotor is also of a polycarbonate resin and the coupon fasteners are comprised of a polyethylene resin. In accordance with each test procedure, the coupons are fastened to the rotor, which thereafter is rotated so as to provide a relative velocity of the coupons and the water at a linear rate of 1.3 feet per second (400 mm/s) and the test is continued for a period of 48 hours. The test water solution is buffered at a pH of about 8.5.

At the completion of each test sequence, any adherent corrosion products are removed from the steel coupons by immersion and light brushing in an aqueous 70% ammonium citrate solution maintained at 70° C. The rinsed and dried coupons are thereafter reweighed and their corrosion rates are calculated based on weight loss which is expressed in terms of mean rate of corrosion in millimeters per year (mm/a).

The composition of the several test water systems and the corrosion rate results obtained are set forth in Table 1.

TABLE 1

TEST WATER SYSTEMS AND CORROSION RATE RESULTS

| Test Sample | Components (mg/l) | | | | | | Corrosion Rate (mm/a) |
|---|---|---|---|---|---|---|---|
| | $Na_2MoO_4$ | HEDP | MBT | $ZnSO_4$ | $MnSO_4$ | $Ni(NO_3)_2$ | |
| A | — | — | — | — | — | — | 2.60 |
| B | — | 25 | 5 | — | — | — | 0.91 |
| C | 10 | 25 | 5 | — | — | — | 0.75 |
| D | 20 | 25 | 5 | — | — | — | 0.76 |
| E | — | 5 | — | — | — | — | 2.48 |
| F | — | 5 | 5 | — | — | — | 2.31 |
| G | 5 | 5 | 5 | — | — | — | 1.93 |
| H | — | — | 5 | 2 | — | — | 2.82 |
| I | — | 5 | 5 | 2 | — | — | 0.55 |
| J | 5 | 5 | 5 | 2 | — | — | 0.07 |
| K | 10 | 5 | 5 | 2 | — | — | 0.08 |
| L | 20 | 5 | 5 | 2 | — | — | 0.14 |
| M | 10 | 25 | 5 | — | 5 | — | 0.42 |
| N | 20 | 25 | 5 | — | 5 | — | 0.19 |
| O | 10 | 25 | 5 | — | — | 5 | 0.42 |
| P | 20 | 25 | 5 | — | — | 5 | 0.19 |

As will be noted, test sample A comprises a control devoid of any supplemental additives and consisting of the soft water test solution. Sample B employs only the HEDP and MBT components expressed in terms of mg/l, which is equivalent to ppm. Samples C and D illustrate the effect of adding 10 and 20 mg/l, respectively, sodium molybdate to sample B. As will be noted, the concentration of the molybdate compound is expressed in terms of mg/l of the total compound added, such that 5 mg/l of the sodium molybdate is equivalent to about 3.9 ppm of the molybdate ion; 10 mg/l of the sodium molybdate compound is equivalent to about 7.8 ppm of the molybdate ion; and 20 mg/l of the sodium molybdate compound is equivalent to about 15.6 ppm of the molybdate ion. Test samples E through I illustrate varying combinations of one, two or three of the constituents and the corresponding corrosion rates obtained on the test coupons.

The dramatic synergistic interaction when all four constituents are employed in accordance with the practice of the present invention is illustrated by test samples J through P. Samples J, K and L illustrate the corrosion rate utilizing a combination of molybdate ions, HEDP, MBT and zinc cations and the effect of an increase in the concentration of molybdate salt from 5 mg/l up to 20 mg/l. The zinc cation, as noted in Table 1, is introduced in the form of the aqueous soluble zinc salt in a concentration of 2 mg/l, which corresponds to a zinc cation concentration of about 0.8 ppm. The dramatic improvement in the inhibition of corrosion at extremely low concentrations of the active constituents relative to control test sample A and the other test samples B-I is typified by test sample J.

Test samples M and N are counterparts of test samples K and L, but wherein the manganese cation is employed in lieu of the zinc cation. As shown, the manganese cation is introduced in the form of an aqueous soluble manganese sulfate salt in a total concentration of 5 mg/l, which corresponds to a manganese cation concentration of about 1.8 ppm. Similarly, test samples O and P employ the nickel cation introduced in the form of an aqueous soluble nickel nitrate salt introduced at a total compound concentration of 5 mg/l, corresponding to a nickel cation concentration of 1.6 ppm. While it is apparent both the manganese and nickel cations contribute to a dramatic synergistic reduction in the corrosion rate of the test solutions, their efficacy is less than the zinc cation present in lower concentrations and, accordingly, the zinc cation constitutes the preferred species.

While it will be apparent the invention herein described is well calculated to achieve the benefits and advantages set forth above, it will be appreciated the invention is susceptible to modification, variation and change without departing from the spirit thereof.

What is claimed is:

1. The process for inhibiting corrosion of metal parts and suppressing scale formation in water systems comprising the steps of dissolving in the water
   (a) an alkali molybdate compound to provide a molybdate ion concentration of at least about 1 ppm,
   (b) a divalent cation selected from the group consisting of $Zn^{++}$, $Mn^{++}$ and $Ni^{++}$, present in an amount of at least about 0.5 ppm,
   (c) 1-hydroxyethylidene-1,1-diphosphonic acid and the aqueous soluble alkali salts thereof, present in an amount of at least about 5 ppm, and
   (d) a compound selected from the group consisting of 2-mercaptobenzothiazole and the alkali salts thereof, 1,2,3-benzotriazole, and tolyltriazole, present in an amount of at least about 1 ppm; each of the constituents present in an effective amount to inhibit corrosion of ferrous surfaces in contact with the water and to suppress scale formation and inhibit corrosion of cupreous surfaces.

2. The process as defined in claim 1, in which said molybdate compound is present in an amount to provide a molybdate ion concentration of at least about 1 ppm up to about 100 ppm.

3. The process as defined in claim 1, in which said molybdate compound is present in an amount sufficient to provide a molybdate ion concentration of from about 2 ppm up to about 10 ppm.

4. The process as defined in claim 1, in which said cation is present in a concentration of from about 0.5 ppm up to about 5 ppm.

5. The process as defined in claim 1, in which said 1-hydroxyethylidene-1,1-diphosphonic acid and said aqueous alkali salts thereof is present in an amount of from about 5 ppm up to about 25 ppm.

6. The process as defined in claim 1, in which said 2-mercaptobenzothiazole, 1,2,3-benzotriazole and tolyltriazole is present in an amount of from about 1 ppm up to about 5 ppm.

7. The process as defined in claim 1, in which said molybdate compound comprises sodium molybdate and is present in an amount to provide a molybdate ion concentration of about 2 ppm to about 10 ppm; said cation comprises zinc and is present in an amount of about 0.5 ppm to about 5 ppm; said 1-hydroxyethylidene-1,1-diphosphonic acid and alkali salts thereof is present in an amount of about 5 ppm up to about 25 ppm, and said compound comprises 1,2,3-benzotriazole present in an amount of about 0.5 ppm to about 5 ppm.

8. A corrosion inhibited and scaling suppressed water system containing as its essential constituents:
 (a) an alkali molybdate compound present in an amount to provide a molybdate ion concentration of at least about 1 ppm,
 (b) a divalent cation selected from the group consisting of $Zn^{++}$, $Mn^{++}$ and $Ni^{++}$ present in an amount of at least about 0.5 ppm,
 (c) 1-hydroxyethylidene-1,1-diphosphonic acid and the aqueous soluble alkali salts thereof, present in an amount of at least about 5 ppm, and
 (d) a compound selected from the group consisting of 2-mercaptobenzothiazole and the alkali salts thereof, 1,2,3,-benzotriazole, and tolyltriazole, present in an amount of at least about 1 ppm; each of the constituents present in an amount effective to inhibit corrosion of ferrous surfaces in contact with the water and to suppress scale formation and inhibit corrosion of cupreous surfaces.

9. The water system as defined in claim 8, in which said alkali molybdate compound comprises sodium molybdate and is present in an amount to provide a molybdate ion concentration of about 2 ppm to about 10 ppm; said cation comprises zinc and is present in an amount of about 0.5 ppm to about 5 ppm; said 1-hydroxyethylidene-1,1-diphosphonic acid and alkali salts thereof is present in an amount of about 5 ppm up to about 25 ppm, and said compound comprises 1,2,3-benzotriazole and is present in an amount of about 0.5 ppm to about 5 ppm.

* * * * *